United States Patent
Pearson

[11] Patent Number: 5,466,338
[45] Date of Patent: Nov. 14, 1995

[54] USE OF DISPERSION POLYMERS FOR COATED BROKE TREATMENT

[75] Inventor: Jon E. Pearson, Aurora, Ill.

[73] Assignee: Nalco Chemical Company, Naperville, Ill.

[21] Appl. No.: 153,506

[22] Filed: Nov. 17, 1993

[51] Int. Cl.$^6$ ............................................. D21H 17/45
[52] U.S. Cl. ........................... 162/168.2; 162/168.3; 162/191
[58] Field of Search ........................ 162/189, 191, 162/DIG. 4, 168.2, 168.3, 168.1, 164.6

[56] References Cited

U.S. PATENT DOCUMENTS

| | | | |
|---|---|---|---|
| 4,268,352 | 5/1981 | Cosper et al. | 162/191 |
| 4,929,655 | 5/1990 | Takeda et al. | 524/458 |
| 5,131,982 | 7/1992 | St. John | 162/168.2 |
| 5,300,194 | 4/1994 | Welkener et al. | 162/DIG. 4 |

Primary Examiner—Peter Chin
Attorney, Agent, or Firm—Robert A. Miller; James J. Drake

[57] ABSTRACT

A process for treating a re-pulped coated broke slurry comprising the addition of a water-soluble polymer dispersion, the water-soluble polymer is formed by polymerizing a water-soluble mixture which comprises: (a) a first cationic monomer represented by the following formula (I):

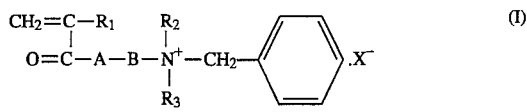

and/or a second cationic monomer represented by the following general formula (II):

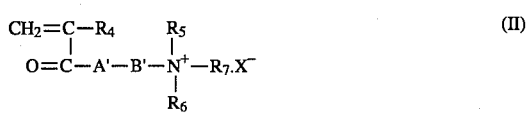

and (b) (meth)acrylamide in an aqueous solution of a polyvalent anion salt, wherein the polymerization is carried out in the presence of either an organic high-molecular multivalent cation comprising a water-soluble polymer containing at least one monomer of formula (II) or an alkyl ester of acrylic acid.

13 Claims, 3 Drawing Sheets

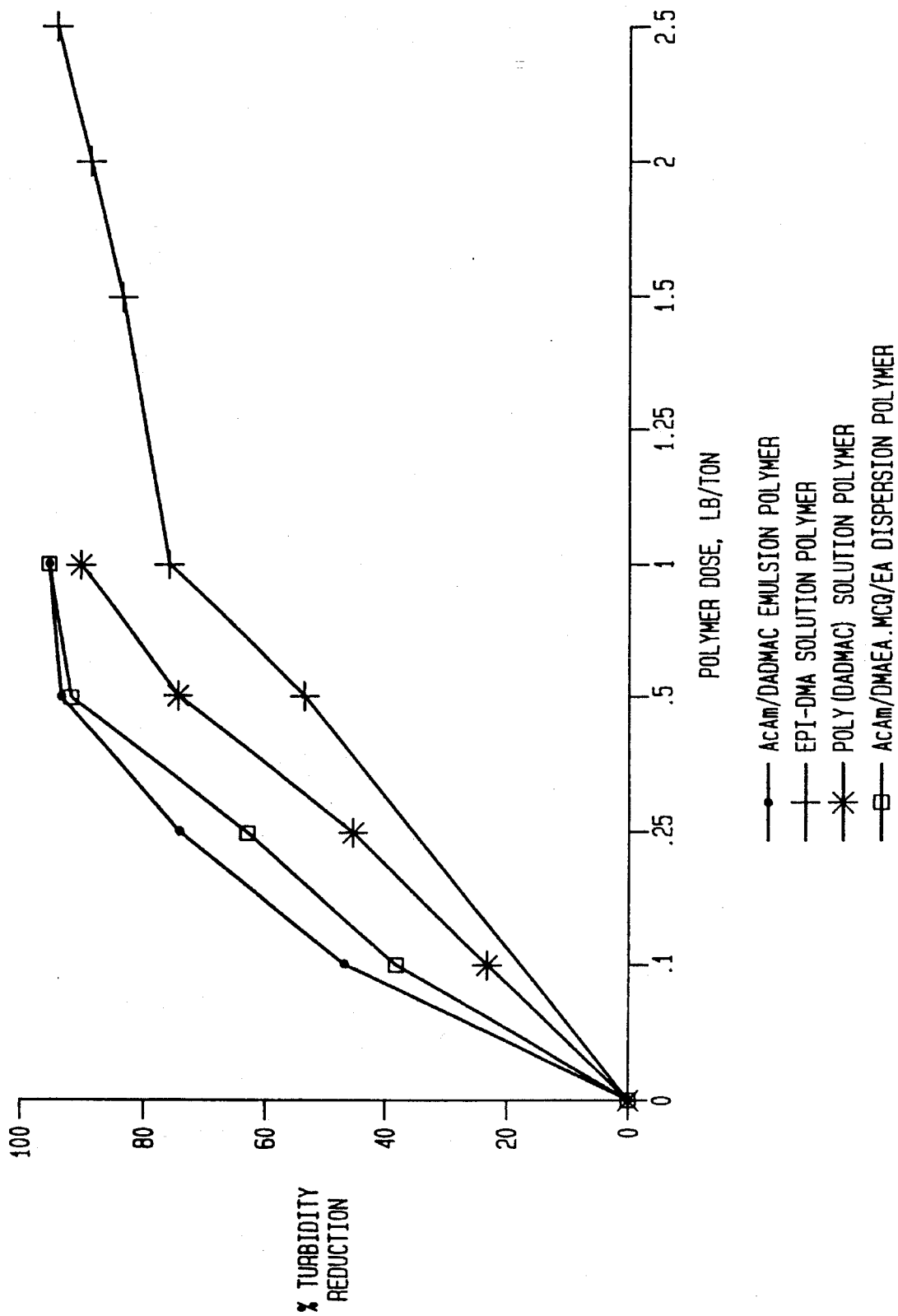

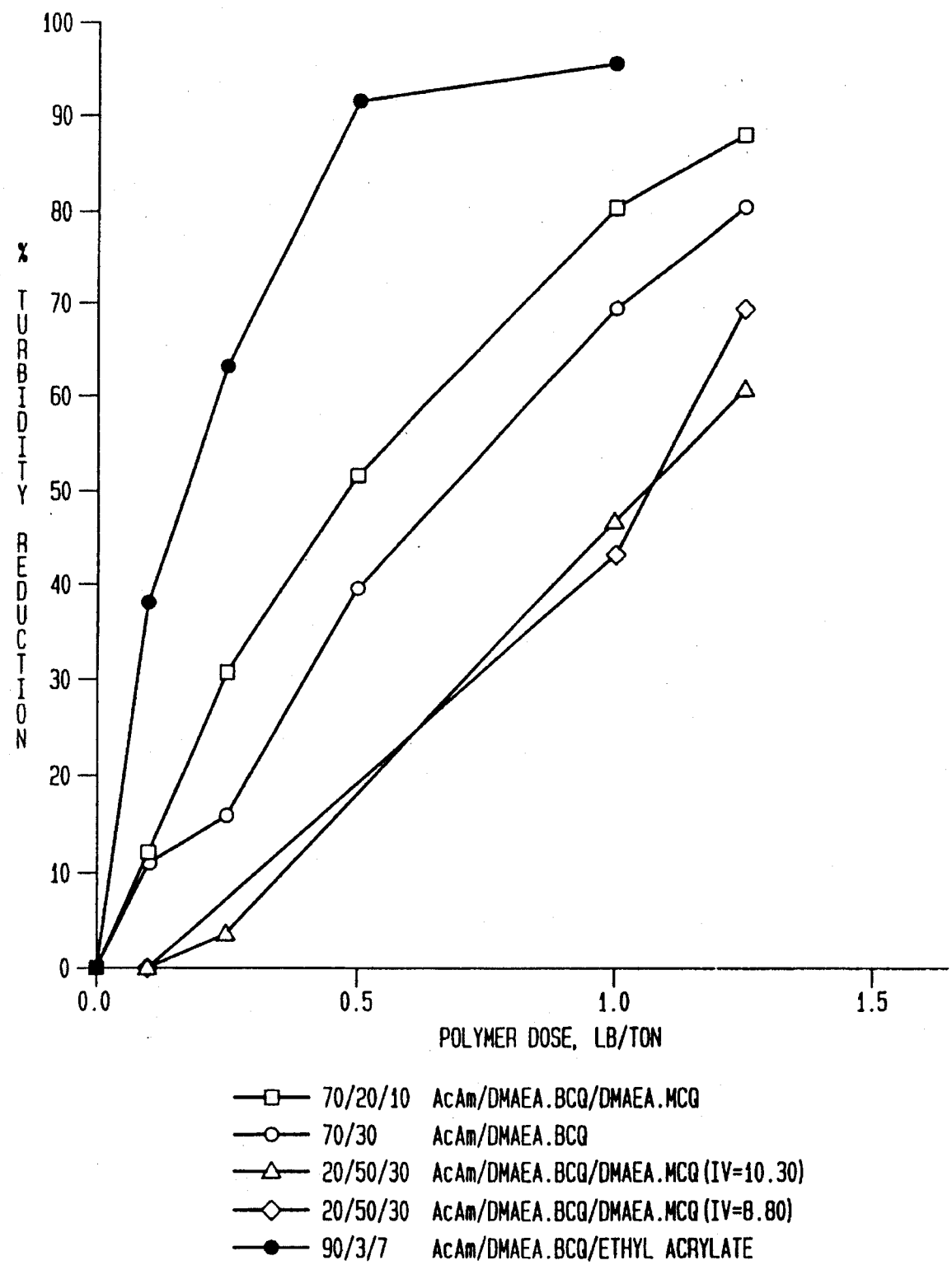

USE OF DISPERSION POLYMERS FOR COATED BROKE TREATMENT

The present invention relates generally to the treatment of a re-pulped coated broke slurry with a dispersion polymer so that it can be recycled as cellulose fiber to a paper machine. The dispersion polymer comprises a water-soluble cationic polymer which is dispersed as fine particles in a salt aqueous solution.

BACKGROUND OF THE INVENTION

"Paper Broke" is a term used by papermakers to described that paper which they cannot or do not sell because it does not meet minimum commercial specifications. This paper broke is a valuable source of fiber and is recycled internally at the mill although it may also be sold to other mills as a source of fiber. Unfortunately, paper broke frequently contains coatings that are applied to the base sheet of paper as it is being manufactured. When the paper broke contains these coatings it is referred to as a "Coated Broke". Coated broke presents special problems in the recovery of fiber values because the coatings introduce materials which would not normally be present in the original stock of fiber used to manufacture the base paper sheet.

The coating materials contained on coated broke may account for from about ten (10) to about forty (40) weight percent of the total solids in the paper finish. The major components of the coatings are pigments which normally constitute from about 80 to 95% of the coating mass, and the binders are contained on the coating from about 5 to about 20 weight percent of the coating mass.

The pigments normally are composed of typical pigments and fillers used in manufacture of paper, which pigments and fillers can include clays of various types, calcium carbonate, titanium dioxide, and other similar or specialty pigments and fillers.

The binders used are frequently those binders obtained from normal latex polymers such as those derived from styrene-butadiene resins, polyvinyl acetate resins, polyvinyl alcohol resins, and polyacrylic or polyacrylate resins. Certain binders can be customized depending upon the end result desired by the papermaker.

The combination of these binder materials, which can also include certain natural products such as starches and dextrans, with the pigments and fillers earlier mentioned, all of which are contained as part of the coating in a coated broke presents certain problems when the coated broke is recycled to recover fiber values.

The most difficult problem involved with recycling of coated brokes is derived from the binder materials, sometimes in combination with pigments or fillers, since these polymers and the materials to which they have been attached, are the origin of sticky deposits. These sticky deposits, referred to as "white pitch" cause difficulties when recycled back to the paper machine operation. In addition to these white pitch sticky deposits, problems that are caused can include, but are not necessarily limited to, those problems associated often with the standard pitch derived from natural wood fibers. The problems caused by inclusion of this white pitch in the papermaking process using recycled coated brokes can include offspeck paper caused by holes and/or deposits of the white pitch, machine down time resulting from sheet breaks or more frequent machine cleanup, clogging of the felts used in the manufacture of the base sheet, and the like.

In the past, polymers derived from crosslinked or linear epichlorohydrin/dimethylamine (EPI-DMA) reactants have been used to treat coated broke. These materials, though effective in certain coated broke applications, have difficulties of their own primarily derived from the fact that the materials may be crosslinked and can form gel particles which provide their own difficulties in further processing of the paper sheet. In addition, although this EPI-DMA material is highly cationically charged, as originally considered necessary for this type of application, it has been found that this very high cationic charge density is not necessary for effective treatment of coated broke and the white pitch derived therefrom.

Recently, copolymers containing the monomer diallyl dimethyl ammonium chloride (DADMAC) and acrylamide have been added to re-pulped coated broke slurries for the purpose of coagulating white pitch. Also, homopolymers of DADMAC have also been suggested.

These coagulants come as either solution polymers or as water-in-oil emulsion polymers. Solution polymers are limited to lower molecular weight polymers at relatively low concentrations. It is known that higher molecular weight polymers can provide improved treatment of coated broke. One way of obtaining higher molecular weight polymers in a liquid form is to package the polymer in a water-in-oil emulsion. This type of polymer, though, typically requires more elaborate feeding equipment than that required for the solution polymers, and this has caused a great reluctance amongst papermakers to using this type of polymer.

The present inventor has discovered that high molecular weight dispersion polymers can be successfully used to treat coated broke by coagulating white pitch. Dispersion polymers have an added advantage in that they only require feed equipment similar to that used for a solution polymer. As will be demonstrated in the examples set forth hereafter, dispersion polymers are also substantially more effective than equivalent dosage of solution polymer due to their high molecular weights. Moreover, dispersion polymers are as effective as emulsion polymers, but do not require the elaborate feeding equipment utilized by emulsion polymers.

The present invention also provides many additional advantages which shall become apparent as described below.

SUMMARY OF THE INVENTION

A process for treating a re-pulped coated broke slurry comprising the addition of a water-soluble polymer dispersion. The water-soluble polymer is formed by polymerizing a water-soluble mixture which comprises: (a) a first cationic monomer represented by the following formula (I):

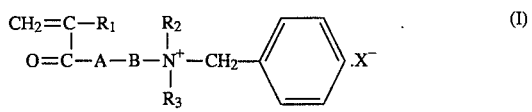

wherein $R_1$ is H or $CH_3$; each of $R_2$ and $R_3$ is an alkyl group having 1 to 3 carbon atoms; A is an oxygen atom or NH; B is an alkylene group of 2 to 4 carbon atoms or a hydrooxypropylene group; and $X^-$ is an anionic counterion, and/or a second cationic monomer represented by the following general formula (II):

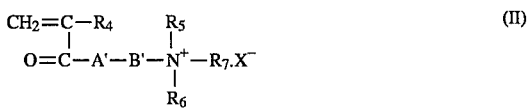

wherein $R_4$ is H or $CH_3$; each of $R_5$ and $R_6$ is an alkyl group having 1 to 2 carbon atoms; $R_7$ is H or an alkyl group of 1 to 2 carbon atoms; A' is an oxygen atom or NH; B' is an alkylene group of 2 to 4 carbon atoms or a hydroxypropylene group; and $X^-$ is an anionic counterion; and (b) (meth)acrylamide in an aqueous solution of a polyvalent anion salt, wherein the polymerization is carried out in the presence of either an organic high-molecular multivalent cation comprising a water-soluble polymer containing at least one monomer of formula (II) or an alkyl ester of acrylic acid.

The dispersion polymer is added to the coated broke slurry in an amount between about 0.2 pounds active polymer per ton of total broke solids to about 10 pounds active polymer per ton of total broke solids, more preferably between about 0.5 pounds polymer per ton total broke solids to about 5 pounds per ton.

The preferred dispersion polymer comprises about 90 mole % acrylamide, about 3 mole % dimethylaminoethyl acrylate benzyl chloride quaternary and about 7 mole % of an alkyl ester of acrylic acid, e.g., ethylacrylate.

Other and further objects, advantages and features of the present invention will be understood by reference to the following specification in conjunction with the annexed drawings, wherein like parts have been given like numbers.

BRIEF DESCRIPTION OF THE DRAWINGS

FIG. 2 is a graph comparing turbidity reduction data for various emulsion, solution and dispersion polymers; and FIG. 3 is a graph comparing turbidity reduction data for various dispersion polymers formed in accordance with the present invention.

DESCRIPTION OF THE PREFERRED EMBODIMENTS

Figure 1:
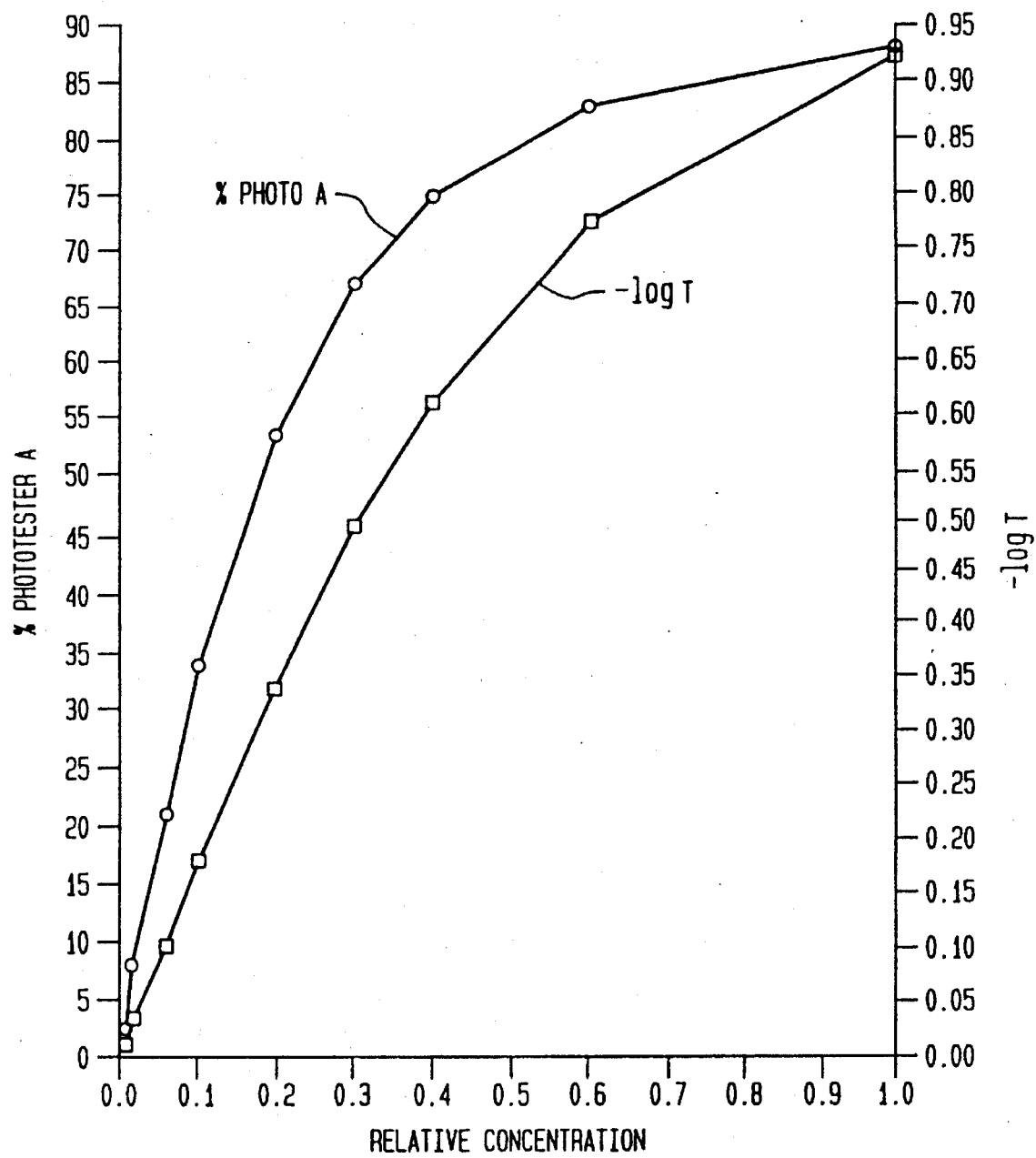
FIG. 1 is a graph presenting data relating to % Photo Tester A (i.e., % Transmittance) to $-\log T$ (i.e., Absorbance) which is a true measure of concentration.

This invention provides a method for treating recycled coated broke which has been re-pulped to a slurry for the purpose of recycling as cellulose fiber to the paper machine. The improvement comprises adding to the coated broke slurry for the purpose of coagulating white pitch an effective amount of a dispersion polymer which can be more easily applied than an emulsion polymer, and is more effective than solution polymers typically used for this application.

The dispersion polymers useful in accordance with the present invention are those set forth in U.S. Pat. No. 4,929, 655 (Takeda et al.), which issued on May 29, 1990. These water-soluble polymer dispersions are formed by polymerizing a water-soluble mixture which comprises: (a) a first cationic monomer represented by the following formula (I)

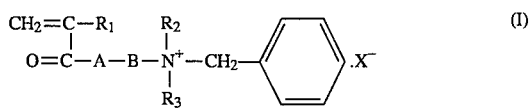

wherein $R_1$ is H or $CH_3$; each of $R_2$ and $R_3$ is an alkyl group having 1 to 3 carbon atoms; A is an oxygen atom or NH; B is an alkylene group of 2 to 4 carbon atoms or a hydroxypropylene group; and $X^-$ is an anionic counterion, and/or a second cationic monomer represented by the following general formula (II):

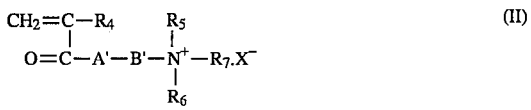

wherein $R_4$ is H or $CH_3$; each of $R_5$ and $R_6$ is an alkyl group having 1 to 2 carbon atoms; $R_7$ is H or an alkyl group of 1 to 2 carbon atoms; A' is an oxygen atom or NH; B' is an alkylene group of 2 to 4 carbon atoms or a hydroxypropylene group; and $X^-$ is an anionic counterion; and (b) (meth)acrylamide in an aqueous solution of a polyvalent anion salt, wherein the polymerization is carried out in the presence of either an organic high-molecular multivalent cation comprising a water-soluble polymer containing at least one monomer of formula (II) or an alkyl ester of acrylic acid.

The first cationic monomer is present in an amount between about 5 to about 100 mole %, the second cationic monomer is present in an amount between about 0 to about 50 mole %, the (meth)acrylamide is present in an amount between about 0 to about 95 mole %, and the organic high-molecular multivalent cation is present in an amount between about 1 to about 10 weight %.

Examples of the monomer represented by the formula (I) include quaternary monomers obtained by treating dimethylaminoethyl (meth)acrylate, diethylaminoethyl (meth)acrylate, dimethylaminopropyl (meth)acrylamide, diethylaminopropyl (meth)acrylamide and dimethylhydroxypropyl (meth)acrylate, and methylated with benzyl chloride.

Examples of the monomer represented by the formula (II) include salts such as dimethylaminoethyl (meth)acrylate, diethylaminoethyl (meth)acrylate, dimethylaminopropyl (meth)acrylamide, diethylaminopropyl (meth)acrylamide and dimethylhydroxypropyl (meth)acrylate, and methylated and ethylated quaternary salts.

The concentration of the above monomers in the polymerization reaction mixture is suitably in the range of 5 to 30% by weight.

The multivalent anionic salt used to disperse the polymer in the present invention is a sulfate or a phosphate, and typical examples of these salts include ammonium sulfate, sodium sulfate, magnesium sulfate, aluminum sulfate, ammonium hydrogenphosphate, sodium hydrogenphosphate and potassium hydrogenphosphate. The salt is used in the form of a salt aqueous solution at a concentration of 15% or more, preferably 20% by weight or more. When the concentration of the salt solution is less than 15% by weight, the polymer is melted and consequently takes the state of a viscous aqueous polymer solution.

The dispersant used in this invention comprises the organic high-molecular multivalent cation which is soluble in the above-mentioned salt aqueous solution, and it is used in an amount of 1 to 10% by weight based on the total weight of the monomers. This dispersant has no effect on depositing the polymer.

The organic high-molecular multivalent cation constituting the dispersant is composed of 20 mole % or more of either the cationic monomer unit represented by the formula (II) or an alkyl ester of acrylic acid and the residual mole % is (meth)acrylamide. The performance of the dispersant is not greatly affected by molecular weight, but the molecular weight of the usable cationic monomer dispersant is in the range of 10,000 to 10,000,000. Nevertheless, since the dispersant is usually subjected to a nitrogen aeration treatment after it is dissolved in the salt aqueous solution together with the monomers, it is operatively convenient to make use of the cationic monomer dispersant having a molecular weight in the range of 10,000 to 100,000. The dispersant is added thereto in an amount of 1 to 10% by weight based on the total weight of the monomers.

A water-soluble radical-forming agent can be employed to aid in the polymerization of the monomers, i.e., water-soluble azo compounds such as 2,2'-azobis (2-amidinopropane) hydrochloride and 2,2'-azobis(N,N'-dimethyleneisobutylamine) hydrochloride.

The amount of dispersion polymer which has been found effective for coagulating white pitch and its components, the pigments and binders described above, ranges from a concentration of approximately 0.2 pounds active polymer per ton of total broke solids up to and including about 10 pounds active polymer per ton of total broke solids.

Preferably, treatment levels range from between about 0.5 pounds polymer per ton total broke solids to about 5 pounds per ton. Most preferably, the effective treatment ranges are between about 0.75 pounds per ton to about 3.5 pounds per ton, although each source of coated broke can and does have its own character and the treatment level demand for our polymers to treat white pitch does vary with the source of coated broke fibers.

EXAMPLE 1

A simple filtrate turbidity test was used to evaluate coagulant activity. This test measures the ability of the test coagulant polymer to retain coated broke materials during vacuum filtration through a coarse filter paper. The test conditions used in the presentation of this information are given in Table 1 below.

TABLE 1

| Filter Turbidity Test Conditions | |
| --- | --- |
| Sample Size | 200 ml coated broke (various sources). |
| Mixing Speed | 500 rpms with Britt jar propeller in 400 ml beaker. |
| Polymer Conc. | Dosed as 0.3 to 0.5 weight percent as polymer. |
| Filtration | 9 cm Buchner funnel and 500 ml filter flask with coarse Filpaco filter paper; sample filtered to completion. |
| Test | Phototester Turbidity of 10 to 20 ml filtrate diluted to 50 ml with deionized water determined. |

Using our test procedures, the majority of pigment materials readily passed through the filter such that turbidities of undiluted filtrates were always too high to be measured directly by our techniques. As a result, a dilution ranging from one to two up to five with deionized water was generally required to bring the turbidity into an acceptable range for measurement by the phototester used in these experiments. Because filtration is improved by the filter cake formed on the filter paper, the turbidity of the filtrate is therefore a function of time during the filtration test. Therefore, the samples were filtered to completion, the filtrate collected and measured, thereby preventing any such time dependence based upon filter cake formed during the filtration test.

A standard phototester was used to measure filtrate turbidity which was taken to be proportional to the concentration of suspended solids. The so called "absorbance" of the phototester does not correspond to any accepted meaningful quantity and is not directly proportional to turbidity, but is a measure of the quantity of suspended solids in the filtrate. Percent Photo A, which is the phototester absorbance reading, is related to the percent transmittance of the instrument by the following simple equation:

$$\% \text{ Photo } A = 100\% - \%T.$$

The percent transmittance (%T) is defined in the normal way as the transmitted light intensity through a particular measuring cell divided by the incidence light intensity. In the absence of absorption and under ideal conditions, the transmittance is related to the turbidity exponentially by the formula:

$$\frac{I_t}{I_o} = \exp(-\tau 1)$$

where 1 is the path length of the cell through which the measurement is taken, and $\tau$ is the turbidity.

After manipulating these various relationships, one can determine that $\tau 1$ is equal to A, where A is the absorbance reading.

FIG. 1 provides the relationships between both % Photo A and log T with solids concentration determined by dilution. The relation between log T or true absorbance A and concentration is much more linear than the relationship to the % Photo A response, however significant deviations from linearity exist primarily at high concentrations even for log T. This would appear to emphasize that this deviation is expected when multiple scattering becomes significant and would occur at high suspended solids concentration.

Although the curves demonstrated in FIG. 1 are different, they vary qualitatively in the same manner, i.e., when one increases or decreases, so does the other. As a result, comparison of relative efficiencies of polymers, i.e., doses required to attain a fixed performance level, is found to be nearly identical irrespective of the base curve used. It is therefore simple to calculate replacement ratios using the dosage curves obtained by measuring % Photo A, since they are nearly the same as those using the correct log T values. Because little error is believed to be introduced, other than some deviations found at very low values of % Photo A, the % Photo A result was used directly to evaluate the data presented herein.

Using this procedure, a matched pair of phototester tubes were identified and one used fort a blank while the other was used for the test samples. These cells were aligned in the phototester the same way for each test and the same pair of cells were used throughout the testing. Data was evaluated by plotting curves of percent turbidity reduction versus polymer dosages, and the percent turbidity reduction is defined as follows:

% turbidity Reduction =

$$\frac{(\% \text{ Photo A of Untreated Broke Filtrate} - \% \text{ Photo A Treated Broke Filtrate})}{\% \text{ Photo A of Untreated Broke Filtrate}} \times 100\%$$

This method of presenting data emphasizes the amount of retention rather than the turbidity of the water attainable. Replacement ratios were measured on the basis of the above techniques. The use of replacement ratios indicates that polymers are being evaluated on an efficiency basis measured by the amount of polymer required to achieve a given performance level versus a standard material. The results of the above tests are given below, wherein the pulp was prepared from 600 grams of dry broke and 15 liters of tap water.

TABLE 2

| Polymer | % Actives | IV (RSV) |
| --- | --- | --- |
| poly(DADMAC) | 15.5 | 1.04 |
| AcAm/DADMAC | 34.0 | |
| EPI/DMA | 46.6 | |
| AcAm/DMAEA.BCQ (70/30) | 20.0 | 6.2 |
| AcAm/DMAEA.BCQ/DMAEA.MCQ (70/20/10) | 20.0 | 6.8 |
| AcAm/DMAEA.BCQ/DMAEA.MCQ (20/50/30) | 20.0 | 10.3 |
| AcAm/DMAEA.BCQ/DMAEA.MCQ (20/50/30) | 20.0 | 8.8 |
| AcAm/DMAEA.MCQ/Ethyl Acrylate | 15.0 | 10.9 |
| AcAm/DMAEA.BCQ/DMAEA.MCQ (70/20/10) | 100 | 13.4 |
| AcAm/DMAEA.BCQ/DMAEA.MCQ (20/50/30) | 100 | 9.6 |

The % turbidity reduction of the various dispersion polymers set forth above in Table 2 are set forth in FIG. 3, attached hereto. FIG. 3 clearly demonstrates that polymer dispersions which comprise acrylamide (AcAm), dimethylaminoethylacrylate benzyl chloride quaternary (DMAEA.BCQ) and ethyl acrylate (EA) exhibit the highest % turbidity reduction per polymer dose. Morever, those dispersions which have a larger mole percent of acrylamide versus dimethylaminoethylacrylate benzyl chloride quaternary also exhibited a higher % turbidity reduction.

EXAMPLE 2

A comparison of the various polymer treatment programs was conducted and the results are set forth in FIG. 2, attached hereto. In this test, a dispersion polymer of the present invention having a polymer composition of acrylamide (AcAm)/dimethylaminoethylacrylate benzyl chloride quaternary (DMAEA.BCQ)/ethylacrylate (EA) with a molar ratio of 90:3:7 was compared against various solution polymers and an emulsion polymer. The emulsion polymer was an acrylamide (AcAm)/diallyldimethylammonium chloride (DADMAC) copolymer having a 50/50 weight percent. The solution polymers where a poly(DADMAC) homopolymer and a copolymer of EPI/DMA.

The data as represented in FIG. 2 demonstrates the dispersion polymer of AcAm/DMAEA.BCQ/EA is more effective at equivalent dosages than either of the solution polymers, and is as effective as the emulsion polymer at the higher dosages. The effective dosages are 0.1 to 1.0 lb/ton (on a polymer basis). The fact that the dispersion polymer demonstrated such excellent activity while having a lower charge density than the other polymers was an extremely unexpected result, since it was previously thought that a high charge density was required for activity in the treatment of coated broke.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

What is claimed is:

1. A process for treating a repulped coated broke slurry which comprises adding to such slurry a water soluble dispersion polymer at a level of from 0.2 to 10 pounds polymer contained in such dispersion per ton of total broke solids, said water soluble dispersion polymer containing:

A. from about 5 to about 100 mole percent of a monomer represented by Formula I:

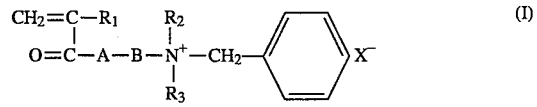

wherein $R_1$ is H or $CH_3$; each of $R_2$ and $R_3$ is an alkyl group having from 1 to 3 carbon atoms; A is an oxygen atom or NH; B is an alkylene group having from 2 to 4 carbon atoms or a hydroxypropylene group; and $X^-$ is an inorganic anionic counterion;

B. from about about 0 to about 50 mole percent of a second water soluble cationic monomer; and, C. from about 0 to about 95 mole percent (meth)acrylamide; and wherein said water soluble polymer is prepared in an aqueous solution of a polyvalent anion salt in the presence of from 1 to 10% by weight based on the total weight of monomers A, B, and C of an organic high molecular weight multivalent cation comprising a water soluble polymer containing at least 20 mole percent of:

a) either at least one monomer represented by Formula II:

wherein $R_4$ is H or $CH_3$; each of $R_5$ and $R_6$ is an alkyl group having from 1 to 2 carbon atoms; $R_7$ is H or an alkyl group having from 1 to 2 carbon atoms; A' is an oxygen atom or NH; B' is an alkylene group of 2 to 4 carbon atoms or a hydroxypropylene group; and $X^-$ is an anionic counterion; or, b) an alkyl ester of acrylic acid.

2. The process of claim 1 wherein said monomer represented by Formula I is selected from the group consisting of the benzyl chloride quaternaries of dimethylaminoethyl (meth)acrylate, diethylaminoethyl (meth)acrylate, dimethylaminopropyl (meth)acrylamide, diethylaminopropyl (meth)acrylamide and dimethylhydroxypropyl (meth)acrylate.

3. The process according to claim 1 wherein said monomer represented by Formula II is selected from the group consisting of: dimethylaminoethyl (meth)acrylate, diethylaminoethyl (meth)acrylate, dimethylaminopropyl (meth)acrylamide, diethylaminopropyl (meth)acrylamide and dimethylhydroxypropyl (meth)acrylate and methylated and ethylated quaternary salts thereof.

4. The process according to claim 1 wherein said water soluble polymer contains from about 5 to about 30 mole percent of a monomer represented by Formula I.

5. The process according to claim 1 wherein said polyvalent anion salt is a sulfate or a phosphate.

6. The process according to claim 5 wherein said polyvalent anion salt is selected from the group consisting of: ammonium sulfate, sodium sulfate, magnesium sulfate, aluminum sulfate, ammonium hydrogenphosphate, sodium hydrogenphosphate and potassium hydrogenphosphate.

7. The process according to claim 1 wherein said polyvalent anion salt is present in an aqueous solution having a polyvalent anion salt concentration of greater than about 15 percent by weight.

8. The process according to claim 1 wherein said organic high-molecular weight multivalent cation comprises 20 mole percent or more of the cationic monomer unit represented by Formula II with the remainder (meth)acrylamide.

9. The process of claim 1 wherein said organic high-molecular weight multivalent cation has a molecular weight in the range between about 10,000 to about 10,000,000.

10. The process according to claim 1 wherein said polymer dispersion is added to said coated broke slurry in an amount between about 0.5 pounds to about 5 pounds of polymer per ton total broke solids.

11. The process according to claim 1 wherein said water soluble polymer is a copolymer of acrylamide, dimethylaminoethylacrylate benzylchloride quaternary and ethylacrylate.

12. The process of claim 11 wherein the mole ratios of said acrylamide, dimethylaminoethylacrylate benzylchloride quaternary and ethylacrylate is about 90:3:7.

13. The process of claim 1 wherein said alkyl ester of acrylic acid is ethyl acrylate.

* * * * *